United States Patent [19]
Bloom

[11] Patent Number: 5,805,757
[45] Date of Patent: Sep. 8, 1998

[54] APPARATUS AND METHOD FOR PRESERVING OPTICAL CHARACTERISTICS OF A FIBER OPTIC DEVICE

[76] Inventor: Cary Bloom, 251 Blaze Climber Way, Rockville, Md. 20850

[21] Appl. No.: 763,052

[22] Filed: Dec. 10, 1996

[51] Int. Cl.⁶ .................................................. G02B 6/26
[52] U.S. Cl. .............................................. 380/137; 385/39
[58] Field of Search .............................. 385/44, 33, 47, 385/49, 88, 31, 89, 137, 99, 51, 50, 118, 135, 16, 25, 134, 81, 62, 69, 72, 87, 136; 65/36, 42, 406, 409, 408; 156/60, 158, 166; 250/227.24

[56] References Cited

U.S. PATENT DOCUMENTS

| Re. 33,296 | 8/1990 | Stowe et al. ............................ 385/15 |
| Re. 34,955 | 5/1995 | Anton et al. ........................... 385/135 |
| 3,854,003 | 12/1974 | Duret .................................. 174/88 C |
| 4,026,632 | 5/1977 | Hill et al. ............................... 385/28 |
| 4,611,884 | 9/1986 | Roberts ................................. 385/44 |
| 4,699,453 | 10/1987 | Roberts ................................. 385/47 |
| 4,701,010 | 10/1987 | Roberts ................................. 385/31 |
| 4,714,316 | 12/1987 | Moore et al. ........................... 385/15 |
| 4,763,977 | 8/1988 | Kawasaki et al. ....................... 385/42 |
| 4,772,085 | 9/1988 | Moore et al. ........................... 385/43 |
| 4,779,945 | 10/1988 | Hill et al. ............................... 385/43 |
| 4,792,203 | 12/1988 | Nelson et al. .......................... 385/135 |
| 4,798,438 | 1/1989 | Moore et al. ........................... 385/43 |
| 4,834,481 | 5/1989 | Lawson et al. ......................... 385/44 |
| 4,895,423 | 1/1990 | Bilodeau et al. ........................ 65/411 |
| 4,900,119 | 2/1990 | Hill et al. ............................... 385/43 |
| 4,906,068 | 3/1990 | Olson et al. ............................ 385/43 |
| 4,923,273 | 5/1990 | Taylor .................................... 385/48 |
| 4,957,338 | 9/1990 | Thorncraft et al. ...................... 385/43 |

(List continued on next page.)

FOREIGN PATENT DOCUMENTS

| 58216216 | 12/1983 | European Pat. Off. . |
| 0 104 513 | 4/1984 | European Pat. Off. . |
| 0293289 | 5/1988 | European Pat. Off. . |
| 0 628 840 | 12/1994 | European Pat. Off. . |
| 2235043A | 8/1990 | United Kingdom . |
| WO87/00934 | 7/1986 | WIPO . |
| 0215668A2 | 9/1986 | WIPO . |
| WO 93/13442 | 7/1993 | WIPO . |
| WO 96/37794 | 11/1996 | WIPO . |

OTHER PUBLICATIONS

"Pressure Tolerant Single–Mode Fiber Coupler", by C.A. Villarruel, et al., Applied Optics, vol. 26, No. 10, 15 May 1987.

Automated Fabrication of Fused Optic Couplers, by Robert Frank Swain, published by the Heriot–Watt University, Edinburgh, Ireland (1993).

"Tapered Optical Fiber Components and Sensors", by L.C. Bobb, et al., Microwave journal, May 1992.

"The Shape of Fiber Tapers", by T.A. Birks et al., Journal of Lightwave Technology, IEEE vol. 10, No. 4, Apr. 1992, pp. 432–438.

"Mass Production of Fused Couplers and Coupler Based Devices", by W.E. Moore et al.

"Loss and Spectral Control in Fused Tapered Couplers", by K.P. Oakley et al., Optical Engineering, vol. 33, No. 12, Dec. 1994, pp. 4006–4019.

(List continued on next page.)

*Primary Examiner*—Akm E. Ullah
*Attorney, Agent, or Firm*—Pepper Hamilton LLP

[57] ABSTRACT

An arrangement (apparatus and method) for hermetically sealing a fiber optic device to preserve its optical characteristics. The fiber optic device includes a device body such as an optical coupler or a multiplexer and optical fibers. Aluminum metal seals are formed on exposed regions of the optical fibers to provide an interface between the optical fibers and an enclosure. The metal seals may be formed directly on the optical fibers or by heating and compressing an aluminum sleeve onto an enclosure having an aluminum surface layer. The aluminum sleeve and surface layers melt and deform around the optical fibers, hermetically enclosing the fiber optic device.

23 Claims, 7 Drawing Sheets

U.S. PATENT DOCUMENTS

| | | | |
|---|---|---|---|
| 4,995,688 | 2/1991 | Anton et al. .............................. | 385/33 |
| 4,997,243 | 3/1991 | Aiki et al. ................................. | 385/92 |
| 4,997,245 | 3/1991 | DuPuy et al. ............................. | 385/16 |
| 4,997,247 | 3/1991 | Stowe ........................................ | 65/410 |
| 4,997,248 | 3/1991 | Stowe ........................................ | 385/43 |
| 4,997,252 | 3/1991 | Sugawara et al. ........................ | 385/35 |
| 4,997,253 | 3/1991 | Enochs ..................................... | 385/88 |
| 5,013,117 | 5/1991 | Fukuma .................................... | 385/15 |
| 5,013,121 | 5/1991 | Anton et al. .............................. | 385/135 |
| 5,028,110 | 7/1991 | Plummer ................................... | 385/43 |
| 5,031,994 | 7/1991 | Emmons .................................... | 385/25 |
| 5,037,176 | 8/1991 | Roberts et al. ............................ | 385/16 |
| 5,066,149 | 11/1991 | Wheeler et al. .......................... | 385/135 |
| 5,067,678 | 11/1991 | Henneberger et al. ................. | 248/68.1 |
| 5,093,885 | 3/1992 | Anton ....................................... | 385/134 |
| 5,121,453 | 6/1992 | Orazi et al. ............................... | 385/43 |
| 5,123,219 | 6/1992 | Beard et al. .............................. | 451/49 |
| 5,136,121 | 8/1992 | Kluska et al. ............................ | 174/93 |
| 5,157,751 | 10/1992 | Maas et al. ............................... | 385/99 |
| 5,159,655 | 10/1992 | Ziebol ....................................... | 385/81 |
| 5,166,992 | 11/1992 | Cassidy et al. ........................... | 385/81 |
| 5,166,994 | 11/1992 | Stowe et al. .............................. | 385/48 |
| 5,179,608 | 1/1993 | Ziebol et al. .............................. | 385/81 |
| 5,179,618 | 1/1993 | Anton ....................................... | 385/136 |
| 5,189,723 | 2/1993 | Johnson et al. ........................... | 385/134 |
| 5,208,894 | 5/1993 | Johnson et al. ........................... | 385/135 |
| 5,214,732 | 5/1993 | Beard et al. ............................... | 385/78 |
| 5,214,735 | 5/1993 | Henneberger et al. ................. | 385/136 |
| 5,222,176 | 6/1993 | Webber et al. ........................... | 385/99 |
| 5,239,604 | 8/1993 | Ziebol et al. .............................. | 385/84 |
| 5,251,002 | 10/1993 | Gryk ........................................ | 356/73.1 |
| 5,261,019 | 11/1993 | Beard et al. .............................. | 385/60 |
| 5,274,731 | 12/1993 | White ....................................... | 385/135 |
| 5,283,852 | 2/1994 | Gibler et al. .............................. | 385/136 |
| 5,293,440 | 3/1994 | Miles et al. ............................... | 385/51 |
| 5,293,582 | 3/1994 | Beard et al. .............................. | 385/78 |
| 5,305,405 | 4/1994 | Emmons et al. .......................... | 385/73 |
| 5,316,243 | 5/1994 | Henneberger .......................... | 248/68.1 |
| 5,317,663 | 5/1994 | Beard et al. .............................. | 385/70 |
| 5,319,728 | 6/1994 | Lu et al. ................................... | 385/67 |
| 5,319,733 | 6/1994 | Emmons et al. ........................ | 385/140 |
| 5,329,600 | 7/1994 | Sasaoka et al. ........................... | 361/89 |
| 5,343,544 | 8/1994 | Boyd et al. ............................... | 385/46 |
| 5,355,426 | 10/1994 | Daniel et al. ............................. | 385/39 |
| 5,363,465 | 11/1994 | Korkowski et al. ...................... | 385/135 |
| 5,367,591 | 11/1994 | Seike et al. ............................... | 385/43 |
| 5,381,497 | 1/1995 | Toland et al. .............................. | 385/80 |
| 5,386,484 | 1/1995 | Ooka et aal. ............................. | 385/11 |
| 5,386,488 | 1/1995 | Oikawa .................................... | 385/92 |
| 5,386,490 | 1/1995 | Pan et al. ................................. | 385/134 |
| 5,395,101 | 3/1995 | Takimoto et al. .................. | 269/289 R |
| 5,422,969 | 6/1995 | Eno ........................................... | 385/54 |
| 5,432,875 | 7/1995 | Korkowski et al. ...................... | 385/47 |
| 5,445,319 | 8/1995 | Pan et al. ................................. | 239/1 |
| 5,459,598 | 10/1995 | Carrington .............................. | 349/156 |
| 5,463,704 | 10/1995 | Ziebol ...................................... | 385/25 |
| 5,475,780 | 12/1995 | Mizrahi .................................... | 385/87 |
| 5,475,782 | 12/1995 | Ziebol ...................................... | 385/131 |
| 5,475,784 | 12/1995 | Bookbinder et al. .................... | 385/134 |
| 5,497,444 | 3/1996 | Wheeler ................................... | 385/135 |
| 5,577,149 | 11/1996 | Averbeck et al. ....................... | 385/134 |
| 5,588,087 | 12/1996 | Emmons et al. ......................... | 385/140 |
| 5,602,952 | 2/1997 | Rashleigh et al. ....................... | 385/100 |

OTHER PUBLICATIONS

"Control of Optical Fibre Taper Shape", Electronics Letters, vol. 27, No. 18, Aug. 29, 1991.

"Fiber–Coupler Fabrication with Automation Fusion–Elongation Processes for Low Excess Loss and High Coupling–Ratio Accuracy", by I. Yokoham, et al., Journal of Lightwave Technology, IEEE, vol. LY–5, No. 7, Jul. 1987.

IC Assembly Technology, pp. 3–26–3–32 (no date).

Fibre–optic Coupler Fabrication at AOFR, by A.J. Stevenson et al., International Journal of Optoelectronics, vol. 6, Nos. 1/2, 1991, pp. 127–144.

"From your space . . . to outer space", Fibre Bragg Gratings, 3M Innovation, Circle No. 76 (no date).

"100ips & 2 microns", Anorad linear motor gantries, Anorad Corporation, Circle 7 (no date).

"1μm, 2g, 3m/s", Anorad LW linear motor stages, Anorad Corporation, Circle 7 (no date).

"The New Standard for Case Erecting and Sealing", ABC Packaging Machine Corporation, Circle 22 (no date).

"All Product Brochure" Schleuniger, Inc., pp. 1–12 (no date).

"Schleuniger US 2545 Stripping Machine", Schleuniger, Inc. (no date).

"Schleuniger FO 7010 Kelvar Cutting Machine", Schleuniger, Inc. (no date).

"Schleuniger PF 1000/PF 2000 Electric Demand Prefeeders", Schleuniger, Inc. (no date).

"CP 1200 Coiling Unit", Schleuniger, Inc. (no date).

"Schleuniger WS 1500/CP 1250 Wire Stacker/Coiling Pan", Schleuniger, Inc. (no date).

"Premise Wiring Communication Fiber Optics", Fiber Instrument Sales Inc., 15th Edition, 1997, pp. 1–68.

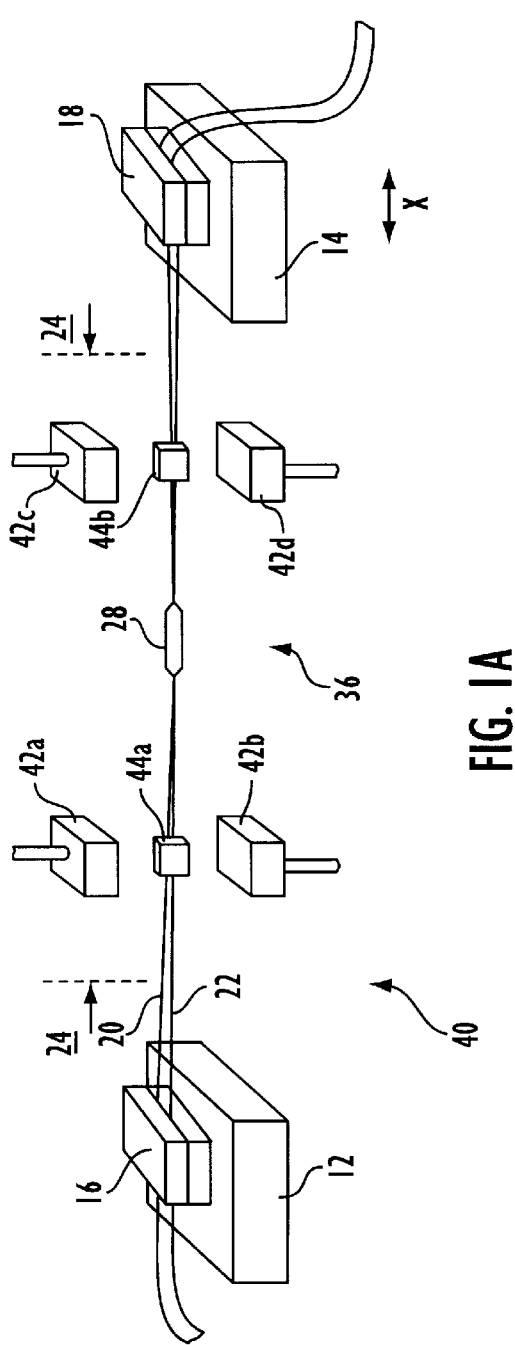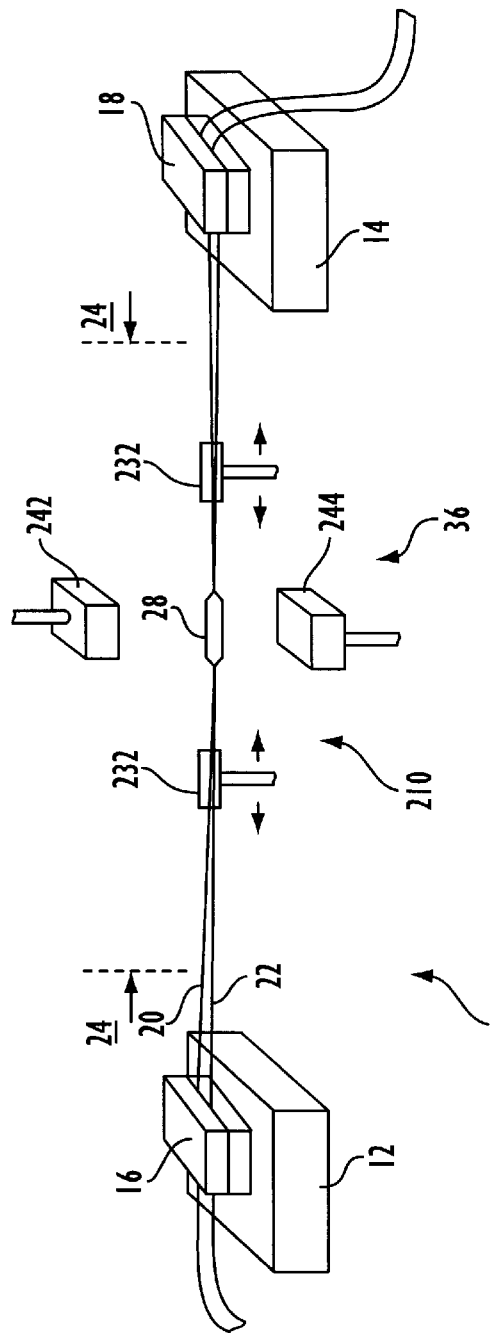

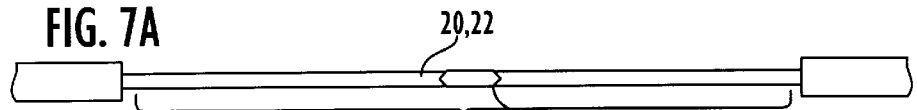
FIG. 7A
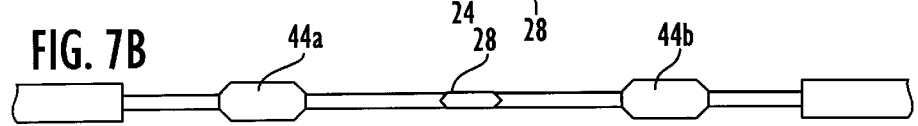
FIG. 7B
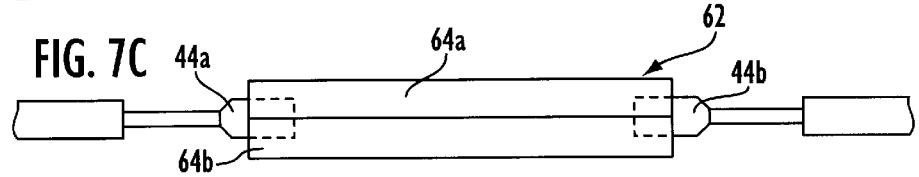
FIG. 7C
FIG. 7D
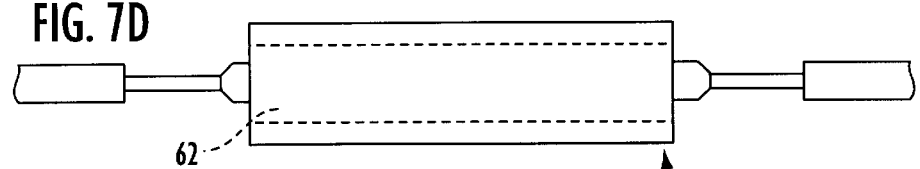
FIG. 7E
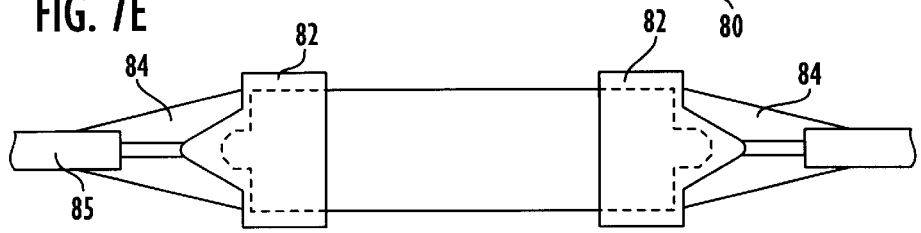
FIG. 7F
FIG. 8
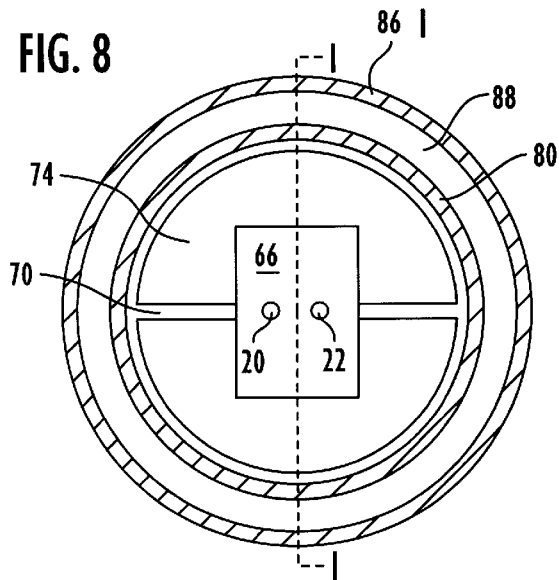

APPARATUS AND METHOD FOR PRESERVING OPTICAL CHARACTERISTICS OF A FIBER OPTIC DEVICE

CROSS REFERENCE TO RELATED APPLICATIONS

This is related to application Ser. No. 08/679,059, filed Jul. 12, 1996 now U.S. Pat. No. 5,680,495.

TECHNICAL FIELD

The present invention relates to protecting fiber optic devices, specifically protecting fiber optic devices using metal.

BACKGROUND ART

Fiber optic devices need to be packaged to enable them to be used for their intended purpose. Packages generally include an inner support structure and an outer protective envelope. A fiber optic device can be generally secured to the inner support structure by positioning the fiber optic device within the structure, for example a quartz body, and bonding the fiber optical device to the support structure with an adhesive such as UV light-curable epoxy. The outer protective envelope, for example a metal tube, is then assembled surrounding the support structure and the bonded device. The package is thus intended to protect the device from environmental influences and damage.

The prior art packaging of fiber optic devices suffers from the fundamental problem that such packaging does not protect the physical integrity or the optical performance of the fiber optic device. Hence, prior art packaging never recognized that the optical characteristics of a fiber optic device need to be preserved to ensure the long term performance of a fiber optic device for its intended purpose.

DISCLOSURE OF THE INVENTION

There is a need for an arrangement (apparatus and method) for sealing a fiber optic device in a manner that preserves the optical characteristics of the fiber optic device.

There is also a need for an arrangement for preserving the optical characteristics of a fiber optic device by physically protecting the fiber optic device from damage caused by environmental effects, for example shock, deterioration due to exposure, etc.

There is also a need for preserving the optical characteristics of a fiber optic device by preserving its operating environment.

There is also a need for preserving the optical characteristics of a fiber optic device by preserving its mechanical state.

There is also a need for an arrangement for hermetically sealing a fiber optic device to preserve its optical characteristics.

These and other needs are attained by the present invention, where metal seals that form a chemical and compressive seal with the optical fiber are used to preserve the optical characteristics of the fiber optic device within a sealed enclosure.

According to one aspect of the present invention, an apparatus includes a fiber optic device comprising at least one optical fiber having an exposed region, first and second metal seals surrounding the optical fiber at first and second locations of the exposed regions, and a first enclosure sealing the fiber optic device between the first and second metal seals. The first enclosure includes a first substrate having a middle inner surface and end surfaces, the end surfaces contacting first surfaces of the first and second metal seals, respectively, and a second substrate having a middle inner surface contacting the corresponding middle inner surface of the first substrate and end surfaces contacting second surfaces of the first and second metal seals, respectively. The metal seals form a chemical and/or compressive seal on the optical fiber, enabling the first enclosure to seal the fiber optic device in a manner that preserves the optical characteristics of the fiber optic device.

Another aspect of the present invention provides a method of hermetically sealing a fiber optic device having at least one optical fiber. The method comprises the steps of positioning the fiber optic device within first and second substrates, and heating and compressing metal positioned between the first and second substrates onto an exposed portion of the optical fiber. The heated and compressed metal seals the fiber optic device within the first and second substrates, preserving the optical characteristics of the fiber optic device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout:

FIGS. 1A and 1B are diagrams of arrangements for hermetically sealing a fiber optic coupler according to first and second embodiments of the present invention, respectively.

FIGS. 7A–7F are diagrams illustrating the sequence of hermetically sealing the fiber optic device according to a first embodiment of the present invention.

FIG. 8 is a cross-section of the apparatus sealing the fiber optic device according to a first embodiment of the present invention.

BEST MODE FOR CARRYING OUT THE INVENTION

Figure 2A:
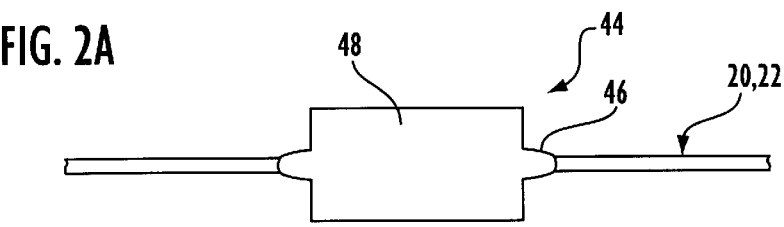
FIGS. 2A and 2B are diagrams illustrating side and top views of the metal blocks of FIG. 1A.

Fiber optic devices are selected based on their manufactured optical characteristics. Once manufactured, it is desirable to maintain the optical characteristics of the fiber optic device to ensure the device will continue to operate as intended.

Different aspects of the fiber optic device may need to be protected to preserve the optical characteristics of the device. One aspect relates to physically protecting the fiber optic device from damage. Such damage may be due to environmental effects, including shock, deterioration due to exposure, etc. Another aspect relates to preserving the operating environment of the device itself. The optical characteristics of many fiber optic devices are determined by their interaction with their respective operating environments. For example, a directional splitter has a splitting ratio determined by the difference in the respective refractive indices of the waveguide and the operating environment surrounding the waveguide. Hence, the splitting ratio is preserved by maintaining the refractive index of the surrounding operating environment.

At the same time, it may be necessary to protect only certain aspects of the operating environment. Although the fiber optic device may be designed to measure an environmental condition by responding to an environmental stimulus according to a predetermined stimulus response, other optical, physical, or chemical influences may adversely affect the operating environment, hence affecting the predetermined stimulus response of the device.

Still another aspect that may need to be protected to preserve the optical characteristics of the fiber optic device relates to preserving the mechanical state of the fiber optic device. The mechanical structure of the fiber optic device will contribute to its optical characteristics. For example, a change in position of a waveguide in a directional splitter may cause changes in forces in the waveguide, such as stress. These changes may affect the optical characteristics in the directional splitter, such as the splitting ratio. Once the device is manufactured with a desired optical characteristic, the physical state of the device as manufactured needs to be preserved to maintain the desired optical characteristic. This may include preserving the position and static forces of the fiber optic device relative to its support structure.

The present invention enables all of the above-identified aspects to be protected to preserve the optical characteristics of the device. The fiber optic device may be an optical fiber coupler, a multiplexer, an attenuator, an optical switch, a laser diode, etc. As described below, the present invention preserves the optical characteristics of the fiber optic device using metal seals formed on exposed regions of the optical fibers. The metal seals bond to the optical fiber chemically and compress on the optical fibers to form a hermetic seal. The metal seals provide an interface for substrate bodies used to enclose the fiber optic device, where a hermetic seal is formed between the metal seals and the substrates by compressing the substrates onto the metal seals. Hence, a fiber optic device may be sealed without the use of adhesives, enabling formation of a hermetic seal preserving the optical characteristics of the optical fiber.

FIGS. 1A and 1B are diagrams illustrating apparatus for sealing a fiber optic device according to first and second embodiments, respectively. The first and second embodiments each form metal seals on exposed portions of the optical fiber, providing an interface for the substrate bodies to enclose the fiber optic device. The first embodiment is directed to formation of metal blocks directly on the optical fiber, followed by compression of substrates onto the metal blocks to form a gas-tight enclosure. The second embodiment uses metal blocks preformed within each substrate, where the substrates are heated and pressed together to seal the fiber optic device within a gas-tight enclosure formed by the sealed substrates.

As shown in FIG. 1A, the apparatus 40 includes a first movable stage 12 and a second movable stage 14 that are independently movable along an axis X. The stages 12 and 14 each include clamps 16 and 18 that are used to secure optical fibers 20 and 22 to the stages 12 and 14. After the optical fibers 20 and 22 are secured to the stages by the clamps 16 and 18, the stages 12 and 14 are moved to position the fiber optic device 36 into a desired state that provides the desired optical characteristic. Specifically, the desired optical characteristics of the fiber optic device 36 may be based on the operating environment of the device and the mechanical state of the device. The operating environment may be a clean-room environment having an atmosphere consist of, for example, an inert gas such as argon at a predetermined pressure and having a predetermined refractive index. In addition, the stages 12 and 14 may add tension to the optical fibers 20 and 22 and twist the optical fibers as necessary.

As described below, the desired optical characteristics are preserved using metal seals that preserve the mechanical state providing the desired optical characteristic. Use of the metal seals in enclosing the fiber optic device also maintains the operating environment of the fiber optic device, e.g., the predetermined refractive index, while at the same time protecting the fiber optic device from environmental effects such as oxygen and water vapor that may degrade the fiber optic device. Depending on the application of the fiber optic device, the enclosure protecting the fiber optic device may be implemented as a hermetic seal providing a gas-tight seal.

The fiber optic device 36 includes optical fibers 20 and 22, each having an exposed region 24, and a device body 28, for example a fiber optic coupler, that is coupled to the optical fibers within the exposed region 24. Although two optical fibers 20 and 22 are shown in FIG. 1A, a single optical fiber may be coupled to the fiber optic device 36, for example, if the fiber optic device 36 is an attenuator. The optical fibers are preferably formed from fused silica, also known as fused quartz.

The method of hermetically sealing the fiber optic device 36 preferably is initiated immediately after formation of the device body 28, although the disclosed method is applicable to pre-existing fiber optic devices that are mounted on the apparatus 40 and have the optical fibers 20 and 22 stripped to expose the optical fibers in the region 24. According to the disclosed embodiment, the exposed region 24 has a length of approximately 40 to 66 millimeters.

As shown in FIG. 1A, the apparatus 40 includes mold portions 42 that are positioned at first and second locations of the exposed region 24 to form metal blocks 44 for hermetically sealing the device 36 according to the first embodiment. Specifically, the molds 42a and 42b are complementary molds that are moved to enclose the optical fibers 20 and 22. As described below, the molds 42a and 42b are used to form the metal block 44a. Similarly, the molds 42c and 42d are moved together to enclose the fibers 20 and 22, in order to form the metal block 44b. Although not shown in FIG. 1A, additional components may be prethreaded onto the optical fibers 20 and 22 between the mounts 16 and 18. Alternatively, one of the mounts may be temporarily opened to add components threaded on the fiber, described below.

Figure 2B:
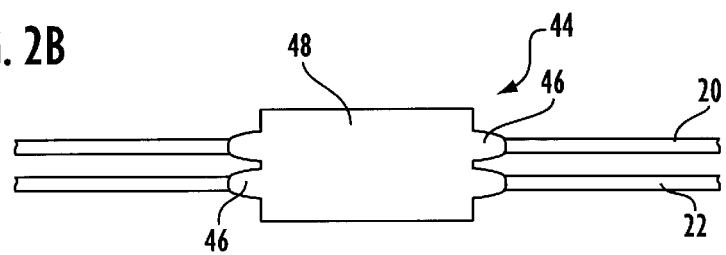

FIGS. 2A and 2B are side and top views of the metal blocks 44 of FIG. 1A, respectively. The metal block 44, also referred to as a metal seal, includes metal extensions 46 that provide strain relief for the optical fibers and a cubic portion 48 that serves as a support structure for enclosures to be added to the assembly, described below. The extensions 46 thus provide structural strength preventing the optical fibers 20 and 22 from bending on an edge. Although disclosed as a cubic structure, the portion 48 of the metal block 44 may have other shapes.

Figure 3A:
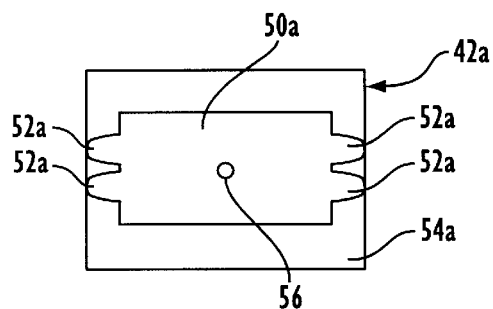
FIGS. 3A and 3B are diagrams illustrating top views of the molds used to form the metal blocks of FIG. 1A.
Figure 3B:
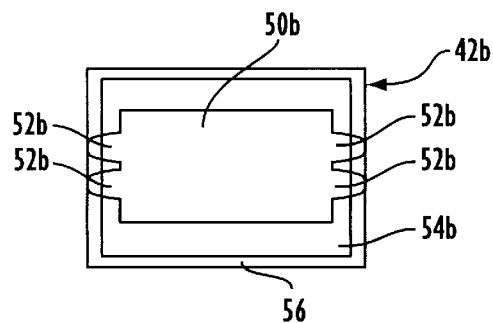

FIGS. 3A and 3B are diagrams illustrating the inner views of the molds 42a and 42b, respectively. As shown in FIG. 3A, the mold 42a includes a cavity 50 used to form the portion 48 of the metal seal 44. The mold 42a also includes notches 52 that are used to form the extensions 46. The mold 42a also includes a surface 54a that comes into contact with the corresponding surface 54b of the complementary mold 42b, and an aperture 56 for evacuating atmosphere and injecting inert gas and molten metal. The complementary mold 42b includes a corresponding cavity 50b complementary to the cavity 50a to form the cube portion 48, and portions 52b complementary to the portions 52a that form the extensions 46. The mold 42b also includes on the surface 54b a mold seal 56 surrounding the outer edge of the surface 54b. The mold seal, preferably a high-temperature polymer seal, forms a tight seal with the mold portion 42a to ensure an airtight fit between the molds 42a and 42b during enclosure of the fibers 20 and 22. Hence, the aperture portions 52a and 52b enclose the optical fibers 20 and 22 to form a tight fit, preventing any leakage of molten metal or any gas.

Figure 4:
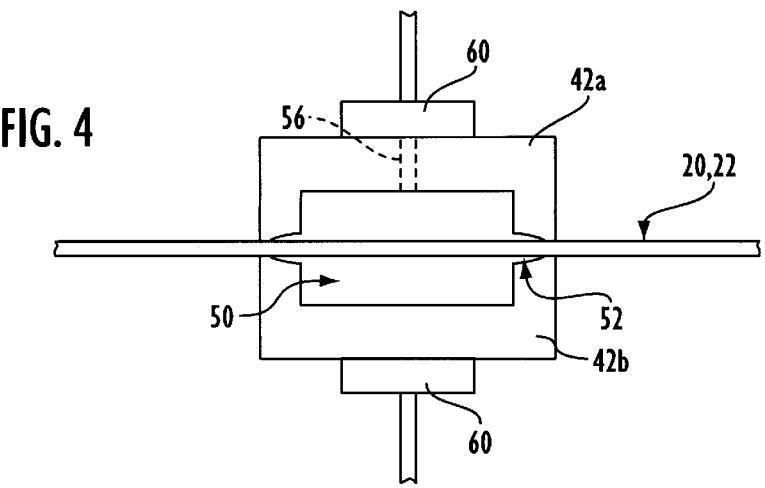
FIG. 4 is a diagram illustrating formation of the metal blocks of FIG. 1A.

FIG. 4 is a diagram illustrating operation of the molds 42 to form the metal seal 44 on the optical fibers. The molds 42a and 42b are moved together to enclose the optical fibers 20 and 22 to form an airtight region for forming the metal seal 44. The region includes the cavity 50 and the region 52. After the molds 42a and 42b are secured around the optical fibers 20 and 22, the atmosphere is evacuated from the cavity 50 via the aperture 56. The overall procedure of forming the fiber optic device 36 and hermetically sealing the fiber optic device is performed in a predetermined oxygen-free operating environment.

After the oxygen-free environment has been evacuated from the chamber 50, an inert gas, for example argon, helium or nitrogen is flooded into the cavity 50 at a positive pressure relative to the atmosphere via aperture 56. After the region 50 has been flooded with the inert gas, a vacuum is generated in the cavity 50 by evacuating the inert gas. Once a sufficient vacuum has been formed in the cavity 50, molten metal is injected into the cavity 50 at a temperature slightly above the melting point of the molten metal. According to the disclosed embodiment, the molten metal preferably consists essentially of oxygen-free, pure liquid aluminum. Hence, the pure liquid aluminum is injected into the cavity 50 via aperture 56 at a temperature slightly above the melting point of pure aluminum, for example 700° C.

According to the disclosed embodiment, aluminum has a relatively high melting point, and will bond to the fused silica optical fibers 20 and 22. Hence, the pure liquid aluminum injected at slightly above 660° C. will bond to oxygen molecules on the surface of the optical fibers 20 and 22 without devitrifying the optical fibers (i.e., breaking down the glass state). The molds 42 include an ultrasonic transducer 60 that applies ultrasonic energy to the molds 42. The ultrasonic transducers 60 reduce the surface energy of the liquid aluminum, reducing the surface tension so that the aluminum wets better to the optical fibers 20 and 22. The molds 42 are formed of ceramic to ensure that the aluminum does not easily wet to the molds 42. In addition, the ceramic material has appropriate thermal characteristics to cool the liquid aluminum to a solid state after a few seconds after injection. After sufficient cooling of the aluminum into a solid state, the molds 42A and 42B may be retracted from the optical fibers 20 and 22, resulting in completed formation of the metal blocks 44 as shown in FIG. 1A and FIG. 7B. If desired, the ultrasonic transducers 60 may be operated continuously throughout the injection process to ensure the aluminum does not wet to the molds.

A particular advantage of the disclosed embodiment is that the liquid aluminum chemically bonds with the fibers 20 and 22 to form a gas-tight seal. In addition, the aluminum liquid tends to compress during cooling. Hence, the cooled aluminum block 44 forms a hermetic seal with the enclosed optical fibers by forming a chemical bond with the optical fibers and by exerting compressive forces on the fibers. The metal blocks 44 also provide a fixed frame of reference with respect to the coupler 28. Specifically, the metal blocks 44 secure the optical fibers in a static state to preserve the mechanical state of the device as described above.

After formation of the metal blocks 44, the assembly including the optical fibers 20 and 22, the coupler 28, and the metal blocks 44 are enclosed within quartz enclosures while secured to the mounts 16 and 18. If necessary, however, the assembly may be moved as desired while maintaining a fixed frame of reference with respect to the coupler 28. Hence, the fiber optic device 36 may be moved for manufacturing or testing purposes without adversely affecting the precise alignment requirements associated with fiber optic assembly. The blocks 44 may then be used to secure the assembly to another mounting assembly for completing the sealing process, described below.

The fiber optic device 36 is hermetically sealed by enclosing the fiber optic device 36 and at least portions of the metal seals 44a and 44b within an enclosure 62, shown in FIG. 7C. The enclosure 62 includes a first substrate 64a and second substrate 64b that are positioned on the metal seals 44a and 44b in an atmosphere defining the preferred operating environment of the fiber optic device. According to the disclosed embodiments, the enclosure 62 is formed in an inert atmosphere, such as nitrogen, helium or argon, that has a predetermined refractive index. The inert atmosphere is preferably at a predetermined pressure greater than ambient air pressure. Hence, formation of the enclosure 62 in the specified atmosphere ensures that the completed enclosure 62 preserves the operating environment of the fiber optic device by sealing the device within a positive-pressure inert atmosphere. The enclosure 62 also protects the fiber optic device 36 from environmental contaminants such as oxygen or water vapor.

Figure 5:
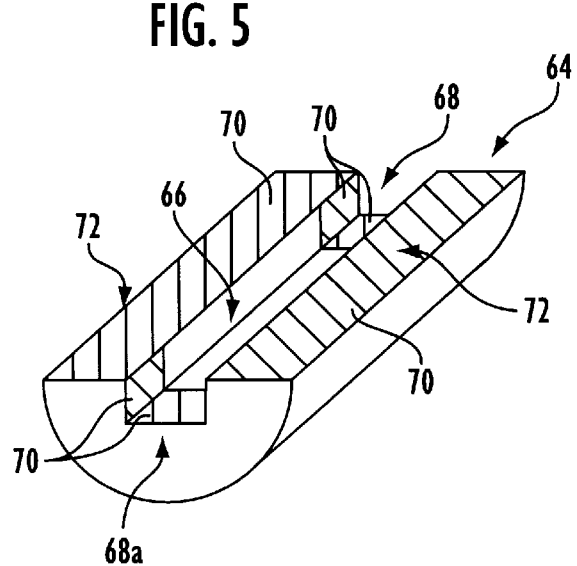
FIG. 5 is a perspective view of a substrate used to form the enclosure according to the first embodiment of the present invention.
Figure 6:
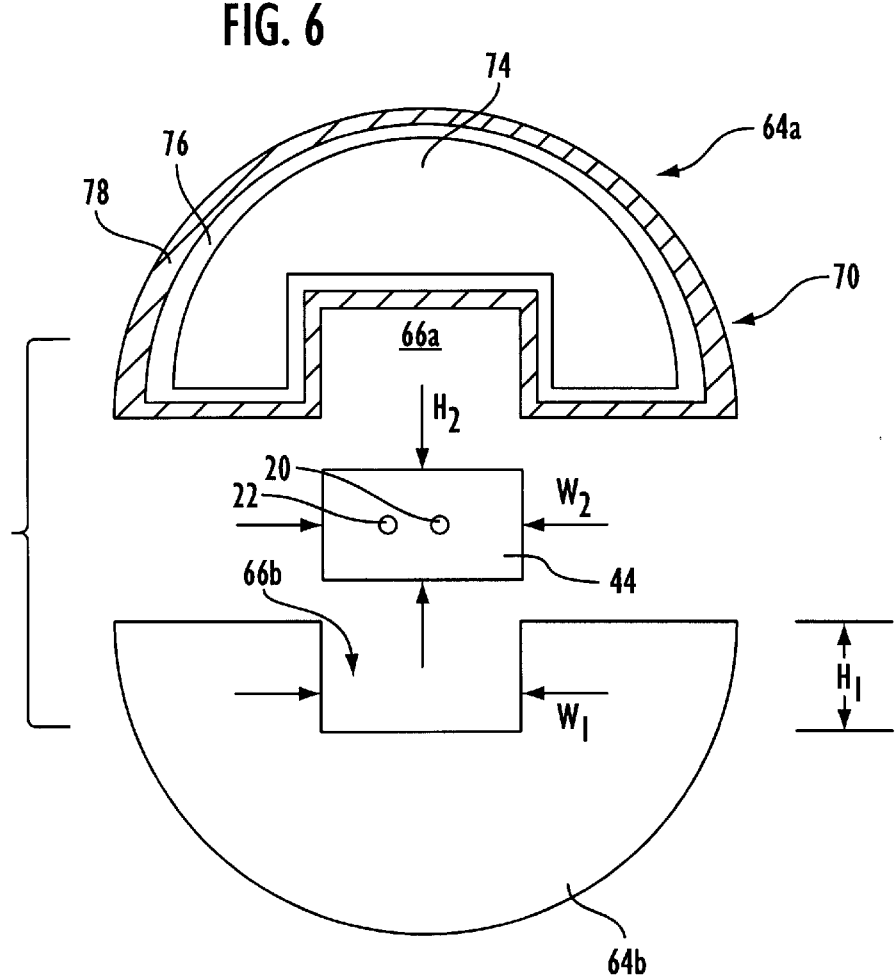
FIG. 6 is a diagram illustrating an upper and lower substrate forming a seal with a metal block according to a first embodiment of the present invention.

FIG. 5 is a perspective view of the substrate 64. As shown in FIG. 5, the substrate 64 includes a trough 66 extending axially along the substrate 64. The trough 66 is designed to accommodate the optical fibers 20 and 22 and the device body 28. The substrate 64 has end regions 68 adapted to engage one of the metal seals 44. For example, the end 68a engages the bottom surface of the metal seal 44a, and the end 68b engages the bottom surface of the metal seal 44b. The substrate 64a includes similar ends that engage the upper surface of the metal seals 44, as shown in FIG. 6. Each substrate 64a and 64b includes a deformable metal layer used to seal the substrate 64 with the corresponding contacting surface. For example, FIG. 5 illustrates that each end 68 includes a deformable metal layer 70. In addition, the middle surfaces 72 of the substrate 64 also include the deformable metal layer 70.

FIG. 6 is a cross-sectional diagram of an end of the substrate 64 in relationship to a metal seal 44 that encloses the optical fibers 20 and 22. Each substrate 64a and 64b includes a body 74 and a deformable metal layer 70 overlying the body 74. According to the first disclosed embodiment, the body 74 consists essentially of fused silica, and the deformable metal layer 70 comprises a first layer 76 and a second layer 78. According to the disclosed embodiment, the first metal layer 76 consists essentially of pure aluminum, and the second metal layer 78 consists essentially of gold. If desired, however, the second metal layer 78 can be eliminated such that the deformable metal layer 70 is formed only of the first aluminum layer 76.

As shown in FIG. 6, the substrates 64a and 64b each have a trough 66 having a width $W_1$, that is less than the width $W_2$ of the metal seal 44. Each of the substrates 64 also have a height $H_1$ that is less than one-half the height of the metal block 44, $H_2$. Hence, the dimensions of the troughs 66a and 66b require the interface metal layer 70 to deform in order to accommodate the metal seal 44. Hence, the metal layers 70 within the trough 66 at the end regions is deformed as the metal seal 44 is pressed into the trough 66 during the compression of the substrates 64a and 64b onto the metal block 44. Hence, the compression of the substrates 64a and 64b onto the metal seal 44 causes the metal seal 44 to be securely fitted into the trough 66, creating a hermetic seal by the displacement of the deformable metal layer 70 around the block 44. In addition, the metal block 44 may also be partially deformed during the compression process. Finally, compression of the substrates 64a and 64b causes the compression of the metal layers 70 at the complementary middle regions 72, creating a hermetic seal between the substrates 64a and 64b along the middle surface 72. If desired, ultrasonic welding may also be performed to weld the contacting metal layers.

After the substrates 64a and 64b have been compressed onto the metal seal 44, the compressed substrates 64 and the metal blocks 44 form an enclosure 62, shown in FIG. 7C, having a gas-tight seal around the device body 28 that maintains the optical characteristics of the fiber optic device by preserving the desired operating environment. The gas-tight seal also protects against environmental contaminants. The enclosure 62 also maintains the optical characteristics of the fiber optic device by physically protecting the device from damage from shock, impact, etc. The enclosure 62 also maintains the physical state of the fiber optic device by preserving the physical orientation and the static forces within the fiber optic device. Hence, any static forces necessary for the fiber optic device to operate according to a prescribed response (e.g., fiber tension, fiber twisting) can be maintained by the metal blocks 44 secured with respect to the substrates 64.

After formation of the enclosure 62, a tubing 80 is threaded over the enclosure 62, shown in FIG. 7D. The tubing 80, formed of fused silica, includes a deformable metal interface layer, such as the aluminum/gold interface layer 70 as described above, on at least the inner surface of the tube. The tube 80 has an inner diameter which is slightly less than the outer diameter of the enclosure 62. Hence, the deformable metal interface layer on the inner surface of the tubing 80 interacts with the deformable interface layer on the outer surface of the enclosure 62 to form a second gas-tight enclosure exerting a compressive force on the enclosure 62. The compressive force by the tubing 80 provides additional sealing between the tubing 80 and the substrates 64a and 64b of the enclosure 62, and maintains the hermetic seal between the substrates 64a and 64b and the metal blocks 44. In addition, the tubing 80 hermetically seals the enclosure 62 within the second gas-tight enclosure, protecting the enclosure 62 from long term environmental effects and maintaining the integrity of the first hermetic seal established by the enclosure 62. Finally, the use of fused quartz for the substrates 64 and the tubing 80 ensures that the thermal expansion coefficients of the enclosures match the fiber optic device. Hence, uniform expansion of the fiber optic device, the optical fibers, the substrates 64 and the tubing 80 preserves the mechanical state of the fiber optic device. The expansion coefficient and ductile nature of the metal seals is sufficient to accommodate the preservation of the mechanical state during thermal expansion.

Ultrasonic welding may also be used to seal the contacting metal layers. If desired, two ultrasonic welding steps may be performed, first during formation of the enclosure 62, and after threading the tubing 80 over the enclosure 62. Alternatively, a single ultrasonic welding may be performed after the threading of the tubing 80 over the enclosure 62. Other types of welding may also be used to fuse the metal layers together.

After sealing the tubing 80 as shown in FIG. 7D, gold caps 82 are added onto each end of the tubing 80 in FIG. 7E to cover the ends of the tubing 80, and the ends of the metal seals 44. The caps 82 may be prethreaded on the optical fibers 20 and 22, or may be attached by crimping a sheet of gold metal at each end. As the gold caps 82 are compressed and ultrasonically welded at each end of the tubing 80, the portions of the metal seal 44 extending from the tubing 80 are partially deformed with the caps 82. After the gold caps 82 have been secured on the ends of the tubing 80, the exposed optical fibers are coated with a conventional sealing material 84, for example rubber or UV-cured acrylate. The sealing material 84 coating the gold caps 82 and the coating 85 also provides stress and strain protection for the optical fibers by transferring forces on the coating 85 to the gold caps 82 instead of the optical fibers. Hence, the gold caps 82 and sealing material 84 provide additional protection for the fiber optic device from external shock.

After the exposed optical fibers have been covered by the sealant 84, a protective metal tubing 86, formed of a nickel-based alloy, for example Invar, is threaded over the assembly. If desired, a nonmetal tubing having relatively low thermal expansion coefficient may also be used. After loosely fitting the metal tubing 86 over the assembly, the metal tubing 86 is secured by injecting into the space between the tubing 86 and the assembly a sealant, for example an RTV (room temperature vulcanizing) silicon coating 88. Once the RTV 88 has hardened, the completed assembly 100 shown in FIG. 7F may be packaged.

FIG. 8 is a cross-section of the apparatus sealing the fiber optic device along lines I—I of FIG. 7F. As shown in FIG. 8, the optical fibers 20, 22 connected to the fiber optic device (not shown) are supported in a desired mechanical state within the enclosure 66 by the metal seals 44. The optical fibers are also hermetically sealed in a gas-tight enclosure 66 formed by the troughs and enclosing the desired operating environment, for example an inert gas at a positive pressure relative to ambient air pressure. The enclosure 66 is bounded by the quartz bodies 74 and the deformable metal layer 70. The quartz tubing 80 provides additional compressive forces on the enclosure 62 to maintain the compressive seal. Hence, even though the RTV coating 88 may be susceptible to moisture, the compressive force exerted by the quartz tubing 80 hermetically seals the enclosure formed by the metal seals and quartz substrates 64a and 64b. Hence, the hermetic seal between the quartz substrates 64a and 64b, and the metal seals 44a and 44b is protected from environmental effects.

The second embodiment of the present invention uses metal blocks 44a and 44b that are initially formed on the quartz substrates to form an enclosure that preserves the optical characteristics of the fiber optic device.

Figure 9A:
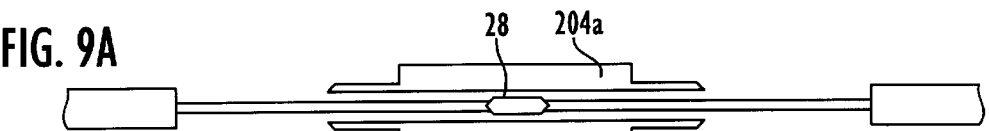
FIGS. 9A–9I are diagrams illustrating the sequence of hermetically sealing the fiber optic device according to a second embodiment of the present invention.

FIGS. 9A–9G summarize the sequence of hermetically sealing the fiber optic device 28 within an enclosure according to the second embodiment. As shown in FIG. 9A, the fiber optic device 28 is positioned between a first substrate 204a and second substrate 204b to form an enclosure 200, shown in FIG. 9B.

Figure 10A:
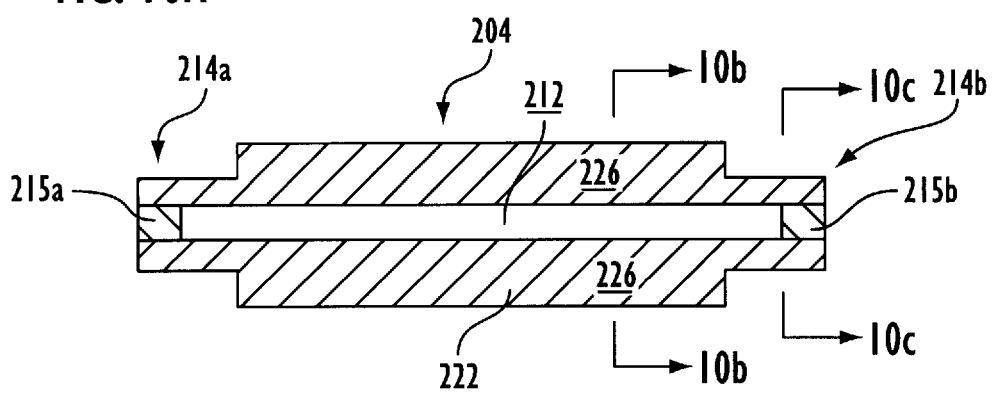
FIGS. 10A, 10B and 10C are diagrams of the substrate of FIG. 9A according to a top plan view, a cross-sectional view along lines 10b—10b, and a cross-sectional view along lines 10c—10c, respectively.
Figure 10B:
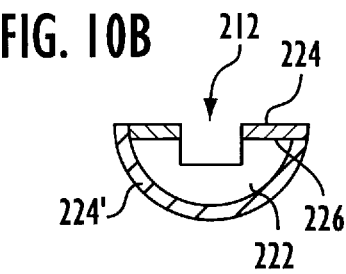
Figure 10C:
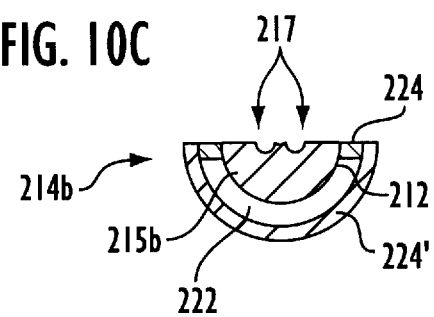
Figure 11:
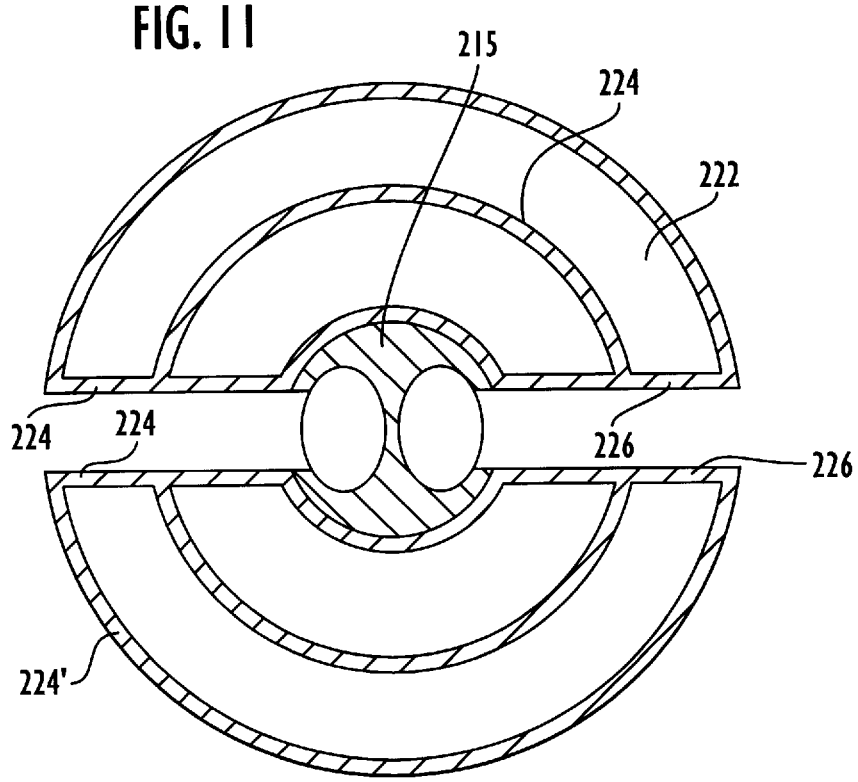
FIG. 11 is an exploded end view of the sealed enclosure of FIG. 9G.

FIG. 10A is a top plan view of substrate 204, and FIGS. 10B and 10C are cross-sectional views of the middle and end portions of the substrate 204, respectively.

As shown in FIGS. 10A and 10B, the substrate 204 includes a trough 212, extending axially along the substrate 204, that accommodates the optical fibers 20 and 22 and the device body 28. As shown in FIG. 10C, end regions 214a and 214b of the substrate 204 have respective metal blocks 215a and 215b adapted to surround the optical fibers 20 and 22. Each metal block 215 includes slots 217 to accommodate the exposed region 24 of optical fibers 20, 22. As shown in FIG. 9A, substrate 204 has tapered portions 220 at its distal ends.

The substrate 204 includes a quartz body 222 having a flat surface 226 and a metal layer 224 overlying at least the surface 226. Another metal layer 224' overlays at least the outside surfaces of end regions 214a, 214b. The quartz body 222 may consist essentially of fused silica, and the metal layers 224 and 224' overlying the quartz body 222 may consist essentially of pure aluminum.

Figure 9B:
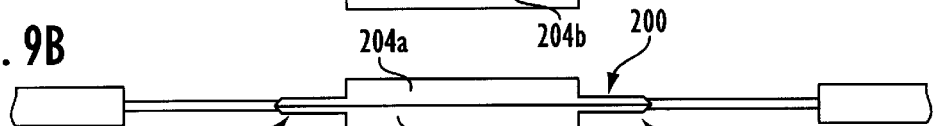

The method of sealing the fiber optic device 28 to preserve its desired optical characteristics according to the second embodiment will now be described with respect to FIGS. 1B and 9A–9I. FIG. 1B is a diagram of an apparatus 210 for hermetically sealing the fiber optic device 28 to preserve its desired optical characteristics according to the second embodiment. As shown in FIG. 9A, the fiber optic device is positioned between substrate 204a and 204b and the substrates 204a and 204b are moved together using support members (not shown), forming enclosure 200 as illustrated in FIG. 9B.

Figure 9C:
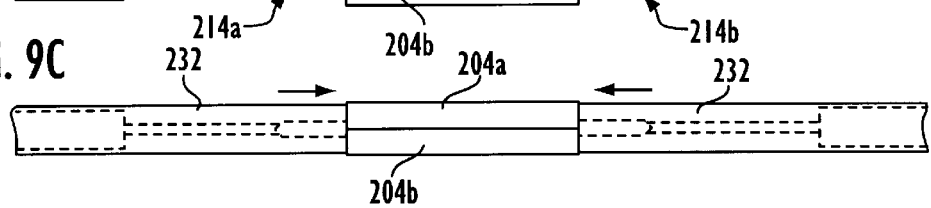

As shown in FIG. 1B, the apparatus 210 includes a pair of hollow end rods 232. The optical fibers 20, 22 are previously threaded through the end rods 232. The end rods 232 are moved to engage the end portions 214a and 214b to align and hold substrates 204a and 204b as shown in FIG. 9C.

Figure 9D:
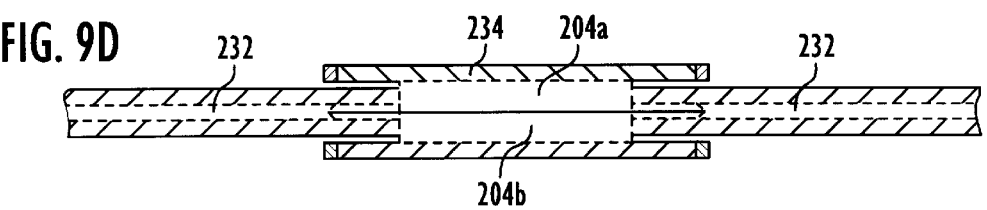

A sleeve 234 consisting essentially of pure aluminum is then threaded over enclosure 200 as depicted in FIG. 9D. Sleeve 234 has an inner diameter slightly greater than the outer diameter of enclosure 200 and, as depicted, a length slightly greater than enclosure 202.

Figure 9E:
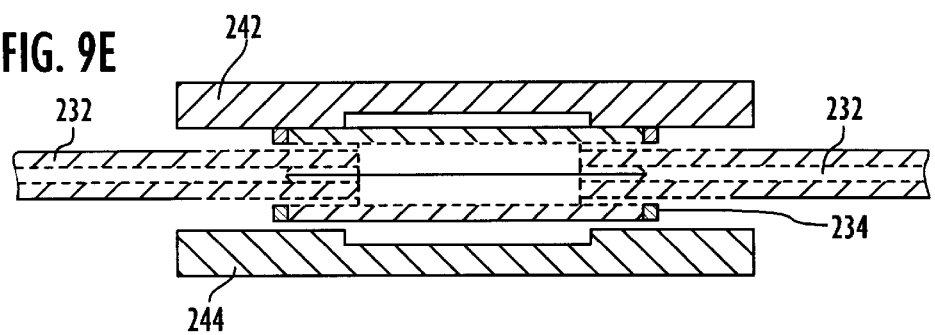
Figure 9F:
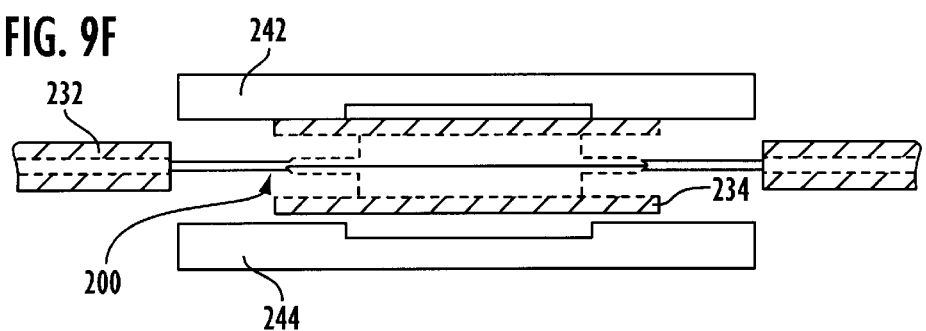

As shown in FIG. 9E, an upper mold member 242 and a lower mold member 244, part of the closing apparatus 210 of FIG. 1B, engage the sleeve 234. The mold members 242 and 244 can include heating elements or an ultrasonic transducer, or alternatively, a separate heater can be included as part of closing apparatus 210. The apparatus 210 exerts sufficient pressure on the sleeve 234 to keep the sleeve 234 and the enclosure 202 together as a unit and in alignment as the end rods 232 are moved apart as shown in FIG. 9F.

The upper and lower mold members 242, 244 heat the sleeve 234 and metal within the substrates 204 to fuse the metal together. Specifically, the mold members 242, 244 heat the sleeve 234, the metal blocks 215 and the metal layers 224 and 224' to just below their melting points. The mold members then compress the sleeve 234 and the substrates 204a and 204b together, causing the metal blocks 215 and the metal layer 224 of the substrate 204a to fuse with the corresponding metal block 215 and metal layer 224 of the substrate 204b. The metal blocks 215 surrounding the optical fibers 20, 22 also hermetically seal the optical fibers as the metal blocks are fused together by bonding with the oxygen molecules within the optical fibers and compressing on the optical fibers as the metal blocks shrink during cooling. Hence, the fusion of the metal blocks 215 and the metal layers 224 hermetically seal optical fibers 20, 22 within the substrates 204a and 204b to seal the enclosure 200. In addition, the sleeve 234 fuses with the outer metal surface 224' of the sealed enclosure 200 to hermetically encapsulate the enclosure 200 with an additional hermetic (gas-tight) seal, forming the hermetic enclosure 260 of FIG. 9G.

Figure 9G:
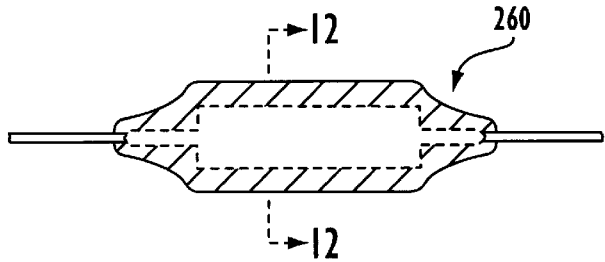
Figure 12:
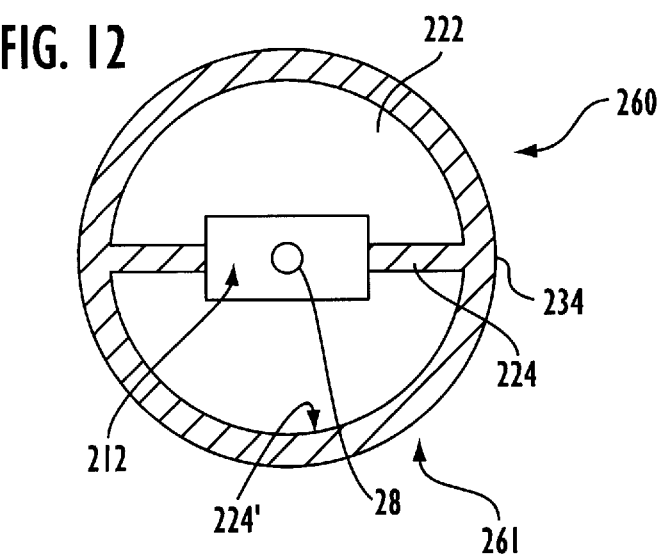
FIG. 12 is a cross-section of the sealed enclosure along lines 12—12 of FIG. 9G.

FIG. 12 is a cross section of the hermetic enclosure 260 of FIG. 9G along lines 12—12. The fiber optic device 28 is supported by the fused metal blocks 215 (not shown) to be suspended within the trough 212 of the quartz bodies 222, preserving the desired operating environment of the fiber optic device 28. The quartz bodies and the fiber optic device 28 are sealed within the metal seals, including the metal surfaces 224 and the fused seal 261 formed between the outer metal surfaces 224' and the sleeve 234. Hence, the fused seal 261 hermetically seals both the fiber optic device 28 and the enclosure formed by the quartz bodies 222, ensuring long-term protection of the device 28.

Figure 9H:
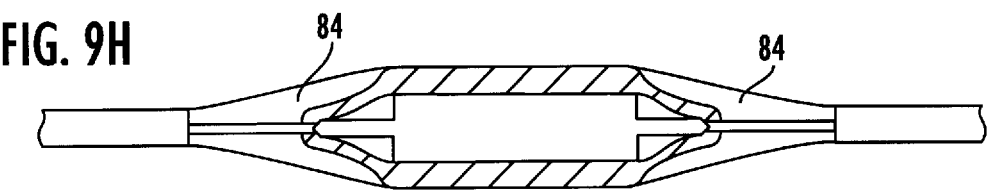

After hermetic enclosure 260 is formed, the exposed optical fibers 20, 22 are coated with the conventional sealing material 84, for example RTV as depicted in FIG. 9H.

Figure 9I:
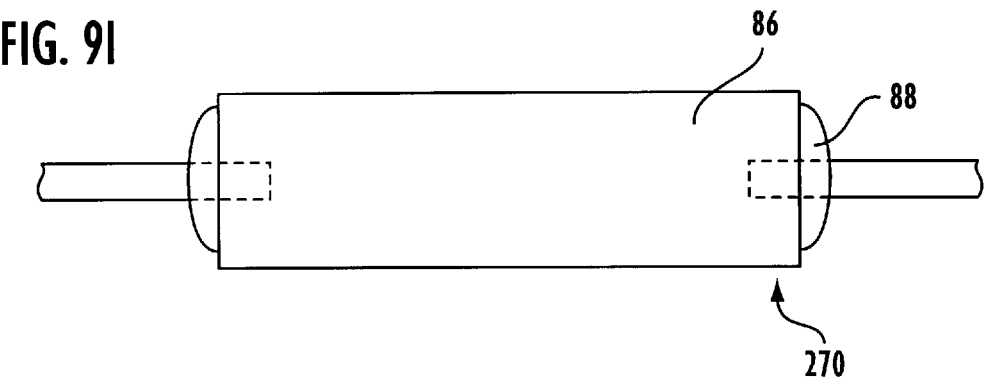

After the exposed optical fibers have been covered by the sealant 84, a protective metal tubing 86, formed of a nickel-based alloy, for example Invar, is threaded over the assembly as depicted in FIG. 9I. If desired, a nonmetal tubing having a relatively low coefficient of thermal expansion may also be used. After loosely fitting the metal tubing 86 over the assembly, the metal tubing 86 is secured by injecting into the space between the tubing 86 and the assembly a sealant, for example an RTV (room temperature vulcanizing) silicon coating 88. Once the RTV 88 has hardened, the completed assembly 270 shown in FIG. 9I may be packaged by coating the ends of the optical fibers as necessary.

Hence, the optical fibers 20, 22 are hermetically sealed in a gas-tight enclosure 260 that encloses the desired operating environment of the fiber optic device, bounded by the quartz bodies 204a, 204b and metal layer 224. The sleeve 234 provides additional compressive forces on the enclosure 260 to maintain the compressive seal. In addition, the sleeve 234 provides its own protection of the quartz bodies 204, providing a gas-tight seal that protects the quartz bodies 204. Hence, even though the RTV coating 88 may be susceptible to moisture, the long-term integrity of the quartz bodies enclosing the fiber optic device is maintained.

According to the present invention, the optical characteristics of a fiber optic device are preserved using metal seals that form a chemical and compressive seal on optical fibers. The metal seals also form a compressive seal between the substrates enclosing the fiber optic device and the deformable metal interface layer. Hence, the metal seals provide an interface for an enclosure, enabling the desired mechanical state of a fiber optic device to be preserved in order to maintain the desired optical characteristics. In addition, the metal seals enable an enclosure to maintain the operating environment of the desired optical device, for example an inert gas having a predetermined refractive index. The use of metal seals also ensures that the desired optical characteristics of the fiber optic device are protected from adverse environmental effects, including shock, contamination due to oxygen, water vapor, etc. to the extent that the fiber optic device is hermetically sealed in a gas-tight enclosure. Finally, the disclosed embodiments provide an arrangement where the long-term reliability and integrity of the first gas-tight enclosure is maintained by protecting the first gas-tight enclosure within a second gas-tight enclosure. Hence, an optical fiber device may be hermetically sealed in an efficient manner to preserve its desired optical characteristics. The industry-acceptable leak rate for hermetic packages is less than $5\times10^{-8}$ Std. CC atm/min. It is believed the disclosed embodiments satisfy this industry standard.

According to the present invention, metal seals are used to preserve the desired optical characteristics of a fiber optic device. Although the disclosed embodiments use substrates having metal layers, it will be appreciated that the metal layers may be added to quartz substrates. For example, the fiber optic device may be placed within an enclosure consisting essentially of fused quartz. Metal may then be added to the surfaces of the quartz substrate, including at the end portions receiving the optical fibers. A complementary quartz substrate would then be placed on top of the first substrate having the added metal, and additional metal would be added to seal the fiber optic device within the quartz substrates. In such an arrangement, the desired optical characteristics of a fiber optic device may be preserved by adding the metal to the quartz substrates.

In addition, the present invention is not limited to protecting fiber optic devices having a plurality of optical fibers. Rather, the disclosed embodiments may be used to protect other fiber optic devices, for example a laser diode, at the end of a single optical fiber.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

I claim:

1. An apparatus comprising:
    a fiber optic device comprising at least one optical fiber having an exposed region;
    first and second metal seals surrounding the optical fibers at respective first and second locations of the exposed region;
    a first enclosure sealing the fiber optic device between the first and second metal seals, the first enclosure comprising:
    (1) a first substrate having a middle inner surface and end surfaces, the end surfaces contacting first surfaces of the first and second metal seals, respectively, and
    (2) a second substrate having a middle inner surface contacting the corresponding middle inner surface of the first substrate and end surfaces contacting second surfaces of the first and second metal seals, respectively, and the middle and end surfaces of the first and second substrates.

2. The apparatus of claim 1, further comprising a sleeve surrounding the first enclosure and compressing the first and second substrates.

3. The apparatus of claim 2, wherein the first and second substrates each further comprise an outer surface, and a metal layer overlying the corresponding middle inner, end, and outer surfaces.

4. The apparatus of claim 3, wherein the sleeve, the metal layers, and the metal seals consist essentially of pure aluminum, the sleeve and the metal layer overlying the outer surface sealing the first enclosure.

5. The apparatus of claim 4, wherein the sleeve and the metal layer overlying the outer surface hermetically sealing the first enclosure.

6. The apparatus of claim 1, wherein the first and second substrates each comprise fused silica and a metal layer overlying at least a portion of the fused silica.

7. The apparatus of claim 1, wherein the first enclosure encloses an inert gas at a predetermined pressure.

8. The apparatus of claim 7, wherein the inert gas is one of nitrogen, helium and argon.

9. The apparatus of claim 8, wherein the predetermined pressure is greater than ambient air pressure.

10. The apparatus of claim 1, wherein the first substrate and the second substrate each comprise a trough accommodating the fiber optic device.

11. The apparatus of claim 1, wherein said first and second substrates each comprise fused silica and a metal layer overlying at least a portion of the fused silica.

12. The apparatus of claim 1, wherein the metal seals form a chemical bond with the exposed optical fiber at the first and second locations, respectively.

13. The apparatus of claim 1, wherein the first and second substrates each have a center section and end portions having a smaller outside diameter than the center section.

14. The apparatus of claim 1, wherein the metal seals provide stress relief between the at least one optical fiber and the enclosure.

15. An apparatus comprising:
    a fiber optic device comprising at least one optical fiber having an exposed region;
    a first enclosure including a first substrate and a second substrate and enclosing said fiber optic device and a portion of said exposed region of said optical fiber, said first and second substrates having at least one end region through which said exposed region of said optical fiber extends;
    said first enclosure including a metal seal sealing the fiber optic device within said first and second substrates at the end region wherein the metal seal is formed from a metal layer overlying at least a portion of each of the first and second substrates and secured to the optical fiber.

16. The apparatus of claim 15, further comprising a sleeve surrounding and compressing the first enclosure.

17. The apparatus of claim 15, wherein said sleeve and said metal seal consist essentially of pure aluminum.

18. The apparatus of claim 15, wherein the first and second substrates comprise fused silica.

19. The apparatus of claim 15, wherein the metal seal is hermatic seal.

20. The apparatus of claim 15, wherein the first enclosure encloses an inert gas at a predetermined pressure.

21. The apparatus of claim 20, wherein the inert gas is one of nitrogen, helium and argon.

22. The apparatus of claim 20, wherein the predetermined pressure is greater than ambient air pressure.

23. The apparatus of claim 15, wherein the metal seal forms a chemical bond with the exposed optical fiber at first and second locations, respectively.

* * * * *